United States Patent Office
3,265,738
Patented August 9, 1966

3,265,738
RING EXPANSION OF CYCLOPENTENE CARBONYL COMPOUNDS
George a Boswell, Jr., Hayward, Calif., assignor to Shell Oil Company, New York, N.Y., a corporation of Delaware
No Drawing. Filed Sept. 27, 1961, Ser. No. 140,986
5 Claims. (Cl. 260—586)

This invention relates to new compositions of matter and to a method for their preparation. More particularly, the present invention concerns the production of carbocyclic compounds by expanding the ring of a cyclic organic starting material.

The compounds of the present invention are produced by the reaction of an organic ring compound containing an unsaturated carbon-carbon linkage activated by an aldehyde or keto group with a mild oxidation reagent to form new ring compounds in which the ring has been expanded by a carbon atom.

It is known that saturated ring compounds in which both a hydroxyl (—OH) group and an aldehyde

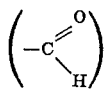

group are attached to the same ring carbon atom may be expanded by hydrolysis in the presence of an acid or a base. The expansion of a saturated ring compound in which both a keto group,

R=hydrocarbon, and a hydroxyl group are attached to the same ring carbon atom is also known. Heterocyclic ring expansion may be accomplished by catalytic dehydration of a compound such as tetrahydrofurfuryl alcohol at elevated temperatures to form the corresponding dihydropyran compound. Furthermore, the ring enlargement of cyclic ketones such as cyclohexanone to cycloheptanone by reaction with diazomethane is well known in the prior art.

It is a principal object of the present invention to provide a convenient process for expanding the carbocyclic ring of compounds which contain the divalent functional grouping

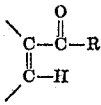

R is H or a monovalent hydrocarbon radical, as part of the carbon ring. In the foregoing formula, R is ordinarily a hydrogen atom or a monovalent hydrocarbon radical such as an alkyl, aryl, alkaryl, aralkyl, alkenyl, cycloalkyl, or cycloalkenyl group. Specific examples of such hydrocarbon groups include methyl, ethyl, propyl, butyl, amyl, hexyl, heptyl, nonyl, decyl, vinyl, propenyl, allyl, crotyl, pentenyl, phenyl, tolyl, benzyl, phenylethyl, xylyl, cumyl, styryl, cinnamyl, naphthyl, xenyl, and cyclic saturated hydrocarbons such as cyclobutyl, cyclopentyl, cyclohexyl and cycloheptyl. Ordinarily, when R is a hydrocarbon radical, the radical will contain up to 20 carbon atoms. Preferably, R will contain from 1 to 10 carbon atoms.

Another object of the present invention is to provide a class of compounds which are useful chemical intermediates and which may be further reacted to form useful final products. In particular, dihydroxy-substituted cyclic ketones are formed by the process of the present invention. The carbonyl group in such cyclic ketones may be reduced to a hydroxyl group to form cyclic 1,2,3-trihydroxy compounds. The cyclic triols so formed may be dehydrogenated to form unsaturated cyclic triols.

Thus, pyrogallol may be prepared by the dehydrogenation of 1,2,3-trihydroxycyclohexane. The esters of the cyclic dihydroxy-ketones may be formed by reaction with an organic or inorganic acid. Elimination of water from the cyclic dihydroxyketones by dehydration yields compounds which are capable of forming stable metal chelates. Removal of the two hydroxy groups produces cyclic ketones which are useful resin solvents and lacquer thinners.

It has now been discovered that these and other objects may be accomplished by a method of expanding the ring of a carbocyclic compound which comprises reacting a cyclic alpha,beta-unsaturated carbonyl compound with a mild oxidizing agent at a temperature between 0° C. and 50° C.

The process of the present invention requires a mild oxidizing agent to attack the carbon-carbon double bond of the group:

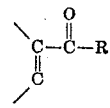

wherein R is a hydrogen atom or a monovalent organic hydrocarbon radical of from 1 to 12 carbon atoms. Suitable organic radicals include alkyl, cycloalkyl, aryl, alkenyl, and cycloalkenyl groups of from 2 to 10 carbon atoms. Such oxidation has been found to yield a cyclic dihydroxy ketone or aldehyde (depending on the R group) which has one more carbon atom in the ring than was originally present in the starting compound. Various means of oxidation may be used as long as the oxidation reactants do not destroy the carbon ring of either the parent or synthesized compound. Good results are obtained by reaction of the aldehyde or ketone with hydrogen peroxide in alkaline solution followed by acid hydrolysis. The expanded ring compounds will include stereoisomers with configurations depending upon the positions of the two hydroxy groups in the final compound. Reaction of the alpha,beta-unsaturated cyclic ketone or aldehyde starting material with hydrogen peroxide and osmium tetroxide also gives excellent yields of the final saturated carbocyclic dihydroxy ketone or aldehyde.

The reaction of the present invention may be represented by the following equation:

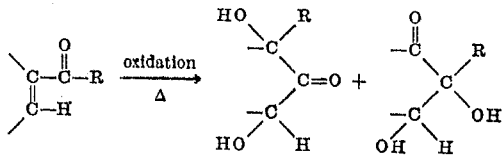

wherein R is H or a monovalent hydrocarbon radical. In the above reaction only the pertinent portions of the carbon ring are shown, but is it to be understood that in all cases the terminal valence bonds are attached to other carbon atoms to for ma carbocyclic ring. Thus, the general reaction may be represented as:

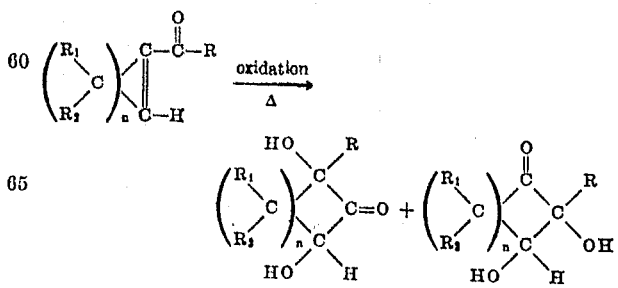

In this reaction $n$ represents an integer which may take any value from one to six; R, $R_1$ and $R_2$ are monovalent radicals selected from the group consisting of the hydrogen atom and monovalent organic radicals. $R_1$, $R_2$ and R may be the same or different. Furthermore, $R_1$ (or $R_2$) may represent a different radical when attached to different carbon atoms in the ring.

The presence of highly reactive substituents in the alpha, beta-unsaturated carbonyl compound is contemplated as within the scope of the present invention. Such reactive substituents do not interfere with the present reaction but may change the stoichiometry of the reaction. For example, a substituent may be oxidized before reaction occurs at the double bond. But when this side reaction is completed, the ring expansion reaction proceeds.

To further exemplify the process and products of the present invention, the following representative reactions are given, it being understood that the planar structures include the stereoisomers.

Expansion of a three-membered carbocyclic ring to a four-membered ring:

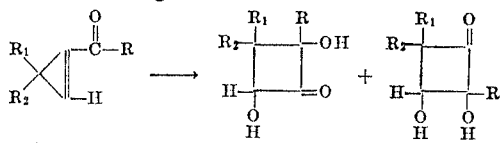

When $R_1$ and R are different alkyl radicals, such as methyl and ethyl and $R_2$ is the hydrogen atom, the reaction is:

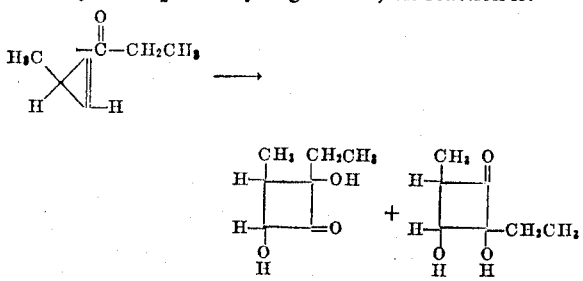

By a suitable choice of R, $R_1$ and $R_2$ intermediates are formed which may be converted to other known derivatives of cyclobutane such as truxinic acid (3,4-diphenyl-1,2-cyclobutanedicarboxylic acid).

Expansion of a four-membered ring to a five-membered ring:

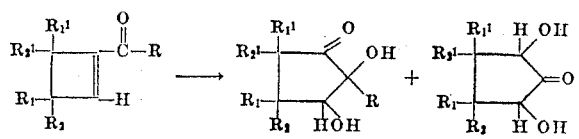

Thus, when $R_1$ is hydrogen, $R_2$ is the methyl radical, $R_1^1$ is a phenyl radical ($\phi$ is —$C_6H_5$), $R_2^1$ is hydrogen, and R is hydrogen, a mixture of 2,5-dihydroxy-3-methyl-4-phenyl-cyclopentanone and 2,3-dihydroxy-4-methyl-5-phenyl-cyclopentanone is obtained:

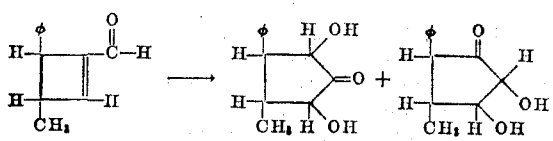

The compounds of the present invention are extremely useful in organic syntheses and may be used to prepare other important compounds. For example, if a five-membered ring is employed as the starting material, the ring may be expanded to a six-membered ring containing a keto group and two hydroxy substituents according to the reaction:

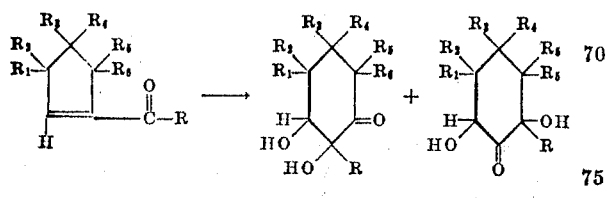

The six-membered dihydroxycyclohexanones thus formed may be hydrogenated in situ to form a substituted 1,2,3-trihydroxycyclohexane, the substituents on the six-membered ring depending only upon the substituents on the original five-membered ring. Omitting these substituents in the formulas for clarity, the reaction is:

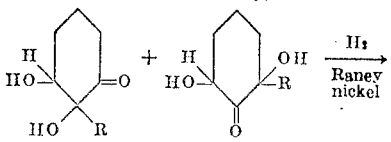

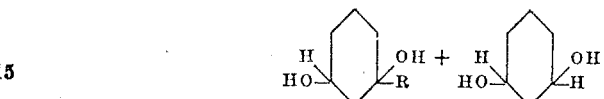

it being understood that all available valences or the ring carbon atoms are substituted by members selected from the group consisting of the hydrogen atom and monovalent hydrocarbon radicals. From the above reactions, it is seen that the intermediate compounds of the present invention provide a convenient route for the preparation of substituted cyclic triols. For example:

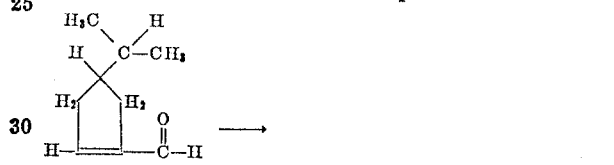

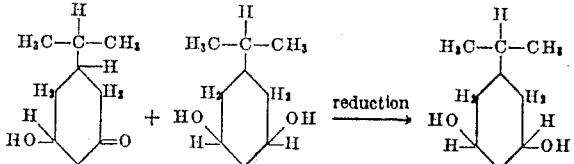

Subsequent dehydrogenation produces an aromatic 1,2,3-triol:

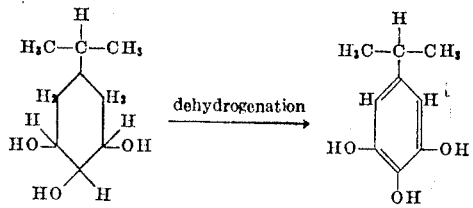

If, in the above sequence of reactions, the isopropyl radical is replaced by a hydrogen atom, pyrogallol results as the final product. Pyrogallol is a compound with strong reducing properties and is useful as a photographic developer. In an alkaline medium, pyrogallol is often used as an absorbent for oxygen in gas analysis, for instance, in the Orsat gas analysis apparatus.

The expansion of a six-membered ring to a seven-membered ring may be followed by conversion to the corresponding cyclic triol according to the following reactions:

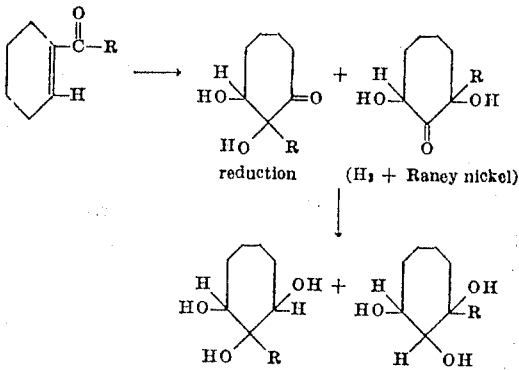

Again, proper selection of the substituents of the starting material determines the final product. To produce tropolone, the starting material is a six-membered carbocyclic alpha,beta-unsaturated aldehyde (1-cyclohexene-1-carboxaldehyde):

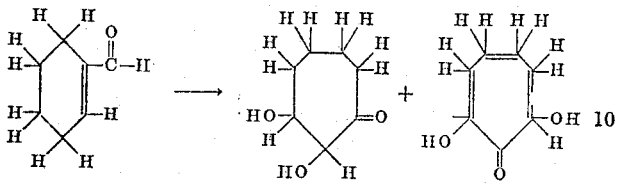

In situ dehydration of the resulting mixture of 2,3-dihydroxycycloheptanone and 2,7-dihydroxycycloheptanone followed by dehydrogenation of the 2-hydroxy-2-cycloheptenone formed yields tropolone:

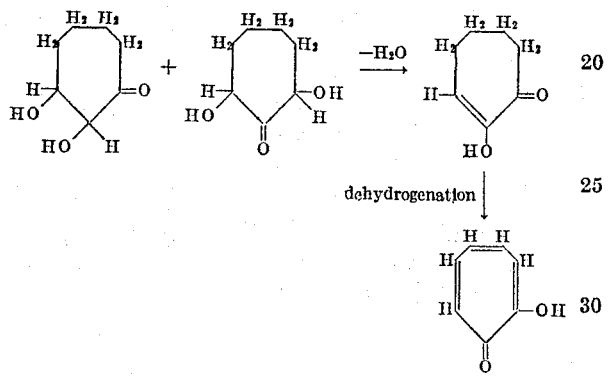

Dehydrogenation may be accomplished by conventional techniques such as by heating with selenium or sulfur. Complete dehydration is readily accomplished by heating the 2-hydroxy-2-cycloheptenone with traces of acid or iodine. Tropolone as well as other substituted tropones find many uses in industry, for instance, as metal deactivators and as preservatives to prevent or retard the catalytic oxidative deterioration of organic materials such as lard.

Similarly, to produce the eight and nine membered substituted ring compounds, the reaction proceeds as follows:

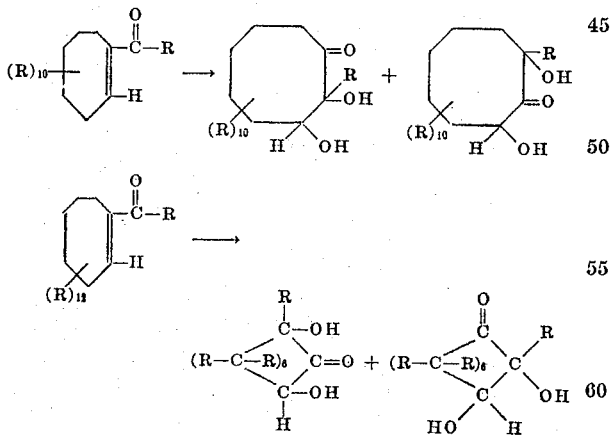

wherein R is a monovalent radical selected from the group consisting of hydrogen, alkyl, aryl, aralkyl, alkaryl, and cycloalkyl radicals.

The ring expansion reaction of the present invention requires heat. Ordinarily, the energy required to effect the reaction is low and the reaction may be carried out at temperatures within the range of from 0° C. to 50° C. in one step. Higher temperatures may be used, but in no case should the temperature be so high that the products are destroyed in substantial amounts. One of the advantages of the present process is that it permits the ring expansion to proceed at a relatively low temperature and at atmospheric pressure. Preferably, the temperature is in the range of from 0° C. to 60° C. and includes ambient room temperature. The reaction mixture of mild oxidizing agent and alpha,beta-unsaturated aldehyde or ketone may be stirred in order to reduce the time required to complete the reaction. The time required for the reaction may vary from 2 hours to 2 days. The amount of oxidizing agent may vary from 5 to .5 moles per mole of alpha,beta-unsaturated aldehyde or ketone, although there is no need for a large excess. The preferred ratio of reactants is 1.1 moles of oxidizing agent per mole of aldehyde or ketone. The oxidizing agents which may be used include epoxidizing agents. In general, oxidizing agents which are equivalent in strength to about 2% potassium permanganate solution may be effectively used in the process of the present invention. Further examples of operable mild oxidizing agents include $H_2O_2$, $OsO_4$, HOCl, AgOAc/$I_2$ (Prevost reaction), and performic acid. Other oxidizing agents include "oxygen carriers" such as the per-acids, especially the percarboxylic acids which are characterized by the group:

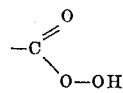

Per-acids with up to 12 carbon atoms may be used. Per-acids with from 1 to 7 carbon atoms such as perbenzoic acid and peracetic acids are particularly suitable. The stronger oxidizing agents may be diluted to the required strength before use.

While the above reactions have been limited to the expansion of the carbon ring by a single carbon atom, it is clear that reiteration of the process allows expansion of a given ring by more than one carbon atom. For example, the five-membered ring may first be expanded to a six-membered ring which is then converted to a substituted cyclic alpha,beta-unsaturated aldehyde or ketone. This compound can then be expanded to a seven-membered ring, with repetition of the process yielding compounds of any desired ring size.

The cyclic alpha,beta-unsaturated aldehydes and ketones which are the starting materials of the present invention may be obtained by conventional reactions, for example, by the oxidation of alcohols:

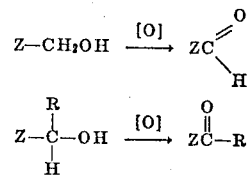

wherein Z represents a cyclic hydrocarbon radical and R is a monovalent hydrocarbon radical. The cyclic hydrocarbon Z may be dehydrogenated to give a cycloalkenyl radical which may then be isomerized with migration of the double bond to the alpha,beta-position with respect to the carbonyl group. Ring closure reactions may also be conveniently employed to obtain the starting materials of the present invention. For example, adipaldehyde undergoes intramolecular aldol condensation to give 1-cyclopentene-1-carboxaldehyde by way of 2-hydroxycyclopentane-1-carboxaldehyde:

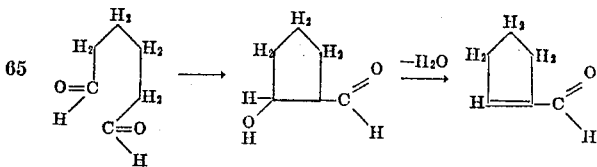

Ring closure in this case occurs so readily that by simply heating adipaldehyde in water it is possible to obtain a 62% yield of 1-cyclopentene-1-carboxaldehyde. Substituted cyclic alpha,beta-unsaturated ketones and aldehydes are obtained by ring closure of the corresponding substituted starting materials.

The process of the present invention may be accomplished in either one or two steps. For example, if an epoxidizing agent is used, the intermediate so formed may be isolated and later hydrolyzed at room temperature with resultant isomerization and expansion of the carbocyclic ring. In general, the reaction intermediates are formed at the lower temperatures, while the actual ring expansion requires heat. This heat is supplied quite simply by allowing the reactants to warm to room temperature.

Further details of the present invention are described in the following additional examples. It is to be understood that the examples are offered only for illustrative purposes and are not to be construed as limiting the invention in any respect.

Example 1

Oxidation of 1-cyclopentene-1-carboxaldehyde with hydrogen peroxide followed by acid hydrolysis and then hydrogenation yielded cyclic triols according to the following reactions:

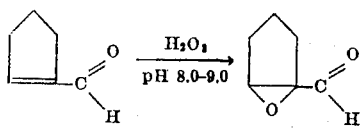

The intermediate 1,2-epoxy-cyclopentane-1-carboxaldehyde was isolated as a crystalline hydrate.

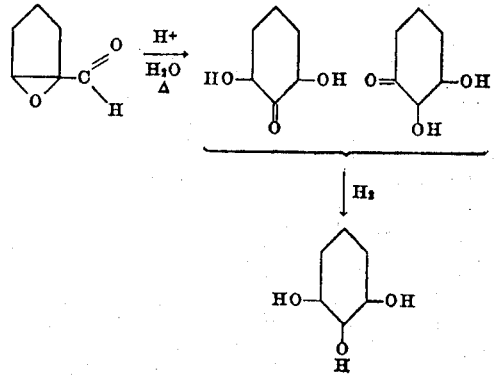

To a one-liter, five-neck, round bottom flask equipped with stirrer, two dropping funnels, thermometer and pH electrodes, there were added 150 ml. of distilled water, 150 ml. of methanol and 55 g. of 30% $H_2O_2$ (0.48 mole). The mixture was held at 38–41° C. while 40 g. (0.417 mole) of 1-cyclopentene-1-carboxaldehyde was added dropwise with stirring at pH 8–8.5 over 10 minutes. The pH was maintained in the desired pH range by the addition of 1 N sodium hydroxide. After stirring for one hour, the pH was raised to 8.5–9.0 and held in this region for an additional 0.5 hour. The reaction mixture was allowed to stand overnight at room temperature.

The methanol was distilled under reduced pressure. The remaining solution was saturated with sodium chloride and extracted with ether. The ether solution was washed with saturated salt solution and dried. On standing exposed to air and moisture, the ether solution deposited colorless, needlelike crystals, yield 20.5 g. (37.9%), M.P. 97–98° C. with analysis in agreement for the hydrate of the epoxyaldehyde.

Analysis

|  | Found | Calculated for 1,2-epoxycyclopentane-1-carboxaldehyde Hydrate, $C_6H_8O_2 \cdot H_2O$ (130.14) |
|---|---|---|
| C | 55.9 | 55.37 |
| H | 7.0 | 7.75 |
| Epoxide, eq./100 g. | [1] 0.61 | 0.767 |

[1] An epoxide determination using a larger sample gave 0.758 eq./100 g.

The infrared spectrum showed strong absorptions at 3.55μ (aldehyde hydrogen) and 5.88μ (aldehyde carbonyl) in $CHCl_3$. There were no bands indicating presence of unsaturation.

A suspension of 17 g. (0.13 mole) of epoxyaldehyde (prepared as in the preceding paragraphs) in 500 ml. of distilled water was heated until solution occurred. After cooling, 5 ml. of trifluoroacetic acid was added to the solution and then the mixture was allowed to stand at room temperature (15–21° C.) for 4 days. A portion of the solvent was removed by distillation under reduced pressure, which caused the residual liquid to darken badly. The solution was neutralized by stirring with excess $BaCO_3$ and then filtered. The hydrolysis product was not isolated and the mixture was carried on to the next step without further purification.

The above solution was diluted with 100 ml. of isopropanol to give a total volume of 200 ml. and then along with 5 g. of Raney nickel was charged to a hydrogenation vessel. The reaction was run at 75–100° C. and 500 p.s.i. $H_2$. When hydrogen uptake ceased (100 mole percent) the colorless reaction mixture was filtered to remove catalyst and the solvents were distilled under reduced pressure to leave a yellow syrup which gave a negative DNP (dinitrophenyl hydrazine) test. The crude product was vacuum distilled (Claisen).

| Cut | B.P./mm. | Yield, g. |
|---|---|---|
| 1 | 45–70° C./4 | 2 |
| 2 | 125–135° C./4 | } 2 |
| 3 | 125–135° C./1 |  |
| 4 | 125–130° C./1 | 4 |
| 5 | 135° C./1 | 5 |
| 6 | 135° C./1 | 5 |

Cut 4 was partially crystalline. Cuts 5 and 6 crystallized, M.P. 85° C., and were taken as product, yield 57.3%. A portion of cut 5 was precipitated from acetone by the addition of ether, M.P. 85° C. The sample was dried over $P_2O_5$ at 80° C./1 mm. for analysis.

Analysis

|  | Found | Calculated for $C_6H_{12}O_3$ (1,2,3-cyclohexanetriol) (132.16) |
|---|---|---|
| C | 54.4 | 54.53 |
| H | 8.9 | 9.15 |
| Hydroxyl, eq./100 g. | 2.191 | 2.27 |
| Alpha-glycol, moles/100 g. | 1.364 | 1.51 |
| Glycerol No., eq.H/100 g. | 0.760 | 0.757 |

Gas liquid chromatography of a portion of the crude distillate from cut 5 after acetylation showed the product to be a mixture of 17% cis,cis-1,2,3-cyclohexanetriol and 83% of cis,trans-1,2,3-cyclohexanetriol and a trace of the trans,trans-1,2,3-cyclohexanetriol.

The infrared spectrum had the following bands (Nujol mull): 3.0μ, 8.35μ, 10.63μ, 10.8μ, 11.25μ, 11.50μ, 11.75μ, 12.27μ and 12.50μ.

Another portion of the crude crystalline distillate was recrystallized twice from acetone-ethanol to give hard, colorless prisms, M.P. 124–125° C. The sample was dried over $P_2O_5$ at 58° C./1 mm.

Analysis

|  | Found | Calculated for $C_6H_{12}O_3$ (132.16) |
|---|---|---|
| C, percent wt. | 54.8 | 54.53 |
| H, percent wt. | 9.2 | 9.15 |
| Alpha-glycol, moles/100 g. | 1.51 | 1.515 |

Gas liquid chromatography of the triacetate showed the material to be 97% cis,trans-isomer, 2% cis,cis-isomer and 1% trans,trans-isomer.

Example II

Oxidation and ring expansion were accomplished using osmium tetroxide (OsO₄) and hydrogen peroxide (H₂O₂) according to the following reactions:

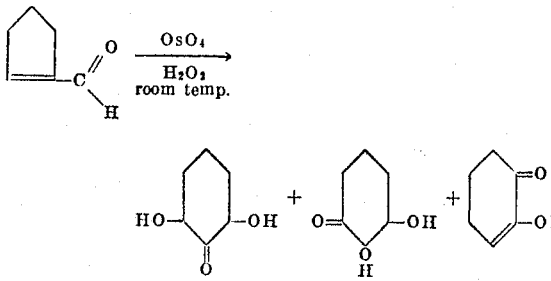

The six-membered cyclic dihydroxyketone reaction products were hydrogenated in situ to produce 1,2,3-cyclohexanetriols and 1,2-cyclohexanediols.

A mixture of 22 g. (0.23 mole) of the unsaturated aldehyde (1-cyclopentene-1-carboxaldehyde), 0.25 g. of OsO₄, 10 ml. of water and 100 g. of isopropanol was stirred at 40° C. while 150 ml. of dilute H₂O₂ (8 g., 0.24 mole) were added over 3 hours. The dark reaction mixture was allowed to stir overnight at room temperature to effect isomerization. The reaction mixture was stirred with Raney nickel (ca. 3 g.) and charcoal and filtered into a hydrogenation vessel. There was added 5 g. of Raney nickel and the vessel was pressured to 800 p.s.i. with hydrogen. Hydrogenation was very rapid at 100° C. The catalyst was removed by filtration and the colorless solution distilled under vacuum.

| Cut | B.P./mm. | Yield, g. | Remarks |
|---|---|---|---|
| 1 | 86–98° C./3 | 4 | Liquid. |
| 2 | 98–125° C./3 | 1 | Do. |
| 3 | 125–132° C./3 | 2 | Crystalline. |
| 4 | 132° C./3 | 8 | Material solidified in condenser and receiver. |
| 5 | 132° C./3 | | |

The bottoms amounted to 6 g. and contained some product but were discarded. Cuts 3–5 were taken as product and represent a 33% yield over-all from 1-cyclopentene-1-carboxaldehyde. The material in cuts 1 and 2 was analyzed by gas liquid chromatography of the triacetates and was found to contain 26% cis-1,2-cyclohexanediol, 6% trans-1,2-cyclohexanediol, 1.4% cis,trans-1,2,3-cyclohexanetriol, and 7.8% cis,cis-1,2,3-cyclohexanetriol.

Cuts 4 and 5 were combined and recrystallized from ethanol as colorless needles, M.P. 135–140° C. A portion was recrystallized twice more from ethanol to give pure cis,cis-1,2,3-cyclohexanetriol, M.P. 148–149° C. The analytical sample was dried over P₂O₅ at 58° C./1 mm.

Analysis

| | Found | Calculated for $C_6H_{12}O_3$ (132.16) |
|---|---|---|
| C | 54.8 | 54.53 |
| H | 9.2 | 9.15 |
| Hydroxyl, eq./100 g. | 2.152 | 2.27 |
| Alpha-glycol, eq./100 g. | 1.520 | 1.515 |
| Glycerol, eq. H/100 g. (periodate-acidimetric) | 0.781 | 0.758 |

The infrared spectrum had a strong absorption at 2.95μ (hydroxyl) and no absorption in the 5.5–6.0μ region.

From the following experiments, it was concluded that the ring expansion reaction of the present invention proceeds without the formation of an intermediate product in which the double bond is hydroxylated. If a dihydroxy intermediate were formed prior to ring expansion in the process of the present invention, immediate hydrogenation of the product would result in the reduction of the aldehyde group to a methylol group. Thus if such an intermediate were formed when 1-cyclopentene-1-carboxaldehyde is oxidized according to the present invention, then immediate hydrogenation of the product would result in the formation of some 1-methylol-1,2-dihydroxycyclopentane. To test this hypotesis, 1-methylol-1,2-dihydroxy-cyclopentane was actually synthesized by hydroxylation of 1-methylol-1-cyclopentene and a peak assigned to the compound as a result of gas-liquid chromatography analysis. However, hydrogenation of the total reaction mixture of Example II followed by gas-liquid chromatography showed no trace of 1-methylol-1,2-dihydroxy-cyclopentane or any of its isomers, thus demonstrating the absence of any hydroxylated intermediate.

I claim as my invention:

1. A method for expanding the ring of a cyclopentene compound which comprises reacting a cyclic alpha,beta-unsaturated carbonyl substituted hydrocarbon, wherein the carbonyl group is attached directly to the cyclopentene ring and the unsaturated bond in the alpha,beta position relative to the carbonyl group forms a part of the cyclopentene ring, with a mild oxidizing agent equivalent in strength to about a 2% permanganate solution at a temperature between 0° C. and 50° C., followed by acid hydrolysis of any epoxy compounds formed in the reaction mixture, the ring expansion being effected at a reaction time of from 2 hours to 2 days.

2. A process for preparing a carbocyclic ring of 6 carbon atoms from a carbocyclic ring of 5 carbon atoms which comprises reacting a 1-cyclopentene-1-carboxaldehyde with a mild oxidizing agent of the group consisting of potassium permanganate, H₂O₂, OsO₄, HOCl, AgOAc/I₂ and percarboxylic acids of up to 12 carbon atoms, at a temperature between 0° C. and 60° C., followed by acid hydrolysis of any epoxy compounds formed in the reaction mixture, the ring expansion being effected at a reaction time of from 2 hours to 2 days.

3. A process for preparing a carbocyclic ring of 6 carbon atoms from a carbocyclic ring of 5 carbon atoms which comprises reacting a 1-cyclopentene-1-ketone having the keto group

wherein R is a hydrocarbon radical of 1 to 10 carbon atoms and with n carbon atoms in the ring with a mild oxidizing agent of the group consisting of potassium permanganate, H₂O₂, OsO₄, HOCl, AgOAc/I₂ and percarboxylic acids of up to 12 carbon atoms, at a temperature between 0° C. and 60° C., followed by acid hydrolysis of any epoxy compounds formed in the reaction mixture, the ring expansion being effected at a reaction time of from 2 hours to 2 days.

4. A process for expanding a five-membered ring compound to a six-membered ring compound which comprises reacting a stoichiometric amount of 1-cyclopentene-1-carboxaldehyde with hydrogen peroxide from 2 hours to 2 days at a temperature of from 15° C. to 25° C. in the presence of osmium tetroxide to produce a mixture containing hydroxy cyclohexanones.

5. A process for preparing 1,2,3-cyclohexanetriol which comprises (1) reacting 1-cyclopentene-1-carboxaldehyde with hydrogen peroxide at a pH of 8.0 to 9.0 to form the crystalline hydrate of 1,2-epoxycyclopentane-1-carboxaldehyde, (2) hydrolysis of said crystalline hydrate at room temperature with dilute acid to form a mixture of dihydroxycyclohexanones, and (3) hydrogenating said mixture of dihydroxycyclohexanones with hydrogen in situ in the presence of Raney nickel catalyst to form 1,2,3-cyclohexanetriol, the ring expansion being effected at a reaction time of from 2 hours to 2 days.

References Cited by the Examiner

UNITED STATES PATENTS 2,514,329 7/1950 Morrell et al.
2,938,040 5/1960 Skinner et al.
3,062,841 11/1962 Yang et al. _____ 260—348.5
3,144,465 8/1964 Ruzicka et al. _____ 260—348.5

LEON ZITVER, *Primary Examiner.*

CHARLES B. PARKER, LORRAINE A. WEINBERGER, *Examiners.*

D. D. HORWITZ, *Assistant Examiner.*